Jan. 9, 1945.  I. R. WILBAR  2,367,080

SPECIFIC GRAVITY TESTING DEVICE

Filed April 24, 1944

I. R. Wilbar
INVENTOR.

BY *C. A. Snowles.*
ATTORNEYS.

Patented Jan. 9, 1945

2,367,080

UNITED STATES PATENT OFFICE 2,367,080

SPECIFIC GRAVITY TESTING DEVICE

Isaac Russell Wilbar, Peach Bottom, Pa.

Application April 24, 1944, Serial No. 532,499

3 Claims. (Cl. 73—33)

This invention relates to a device designed primarily for testing the specific gravity of fluid such, for example, as water containing anti-freeze.

It is an object of the present invention to provide a testing device of this character in which the level indicator is at no time reached by the fluid under test and, therefore, does not become dirty or cloudy so as to interfere with the reading of the indicator unless the same is frequently taken apart and cleaned.

A further object is to reduce the amount of glass used in the construction of the device, and, consequently, reducing the danger of breakage.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1:
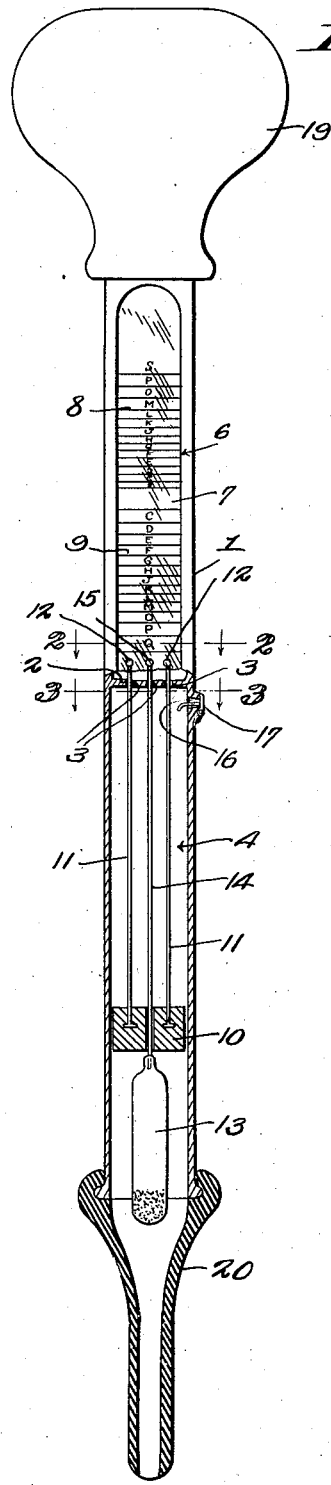
Figure 1 is a view partly in front elevation and partly in section of the complete tester.
Figure 2:
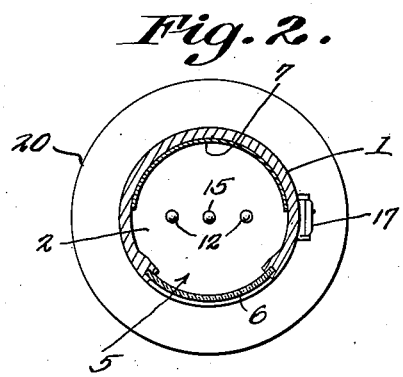
Figure 2 is a section on line 2—2, Figure 1.
Figure 3:
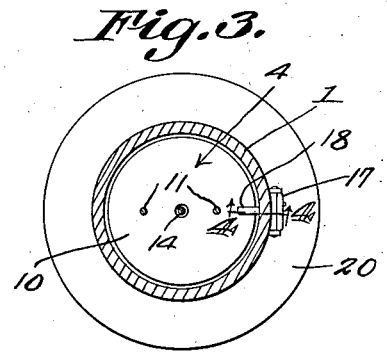
Figure 3 is a section on line 3—3, Figure 1, both sections being enlarged.

Referring to the figures by characters of reference, 1 designates a tube of any suitable material such as plastic or the like which will not break readily, and this tube is divided, adjacent to its center, by a partition 2 having spaced openings 3. The partition divides the interior of the tubular body into a lower chamber 4 and an upper chamber 5, and the upper chamber can be provided with a transparent window 6 located in front of an indicator strip 7 arranged within the tubular body. This indicator strip is preferably provided with upper and lower sets of graduations 8 and 9, the upper graduations being designated preferably by letters of the alphabet arranged successively while the graduations of the lower group are designated by letters of the alphabet reading downwardly in regular succession.

A float 10 formed of cork or the like is mounted to move freely within the chamber 4 and has spaced rods 11 anchored thereto and extending upwardly therefrom through two of the openings 3 in partition 2, there being enlargements or heads 12 at the upper end of the float rods which are visible between the window 6 and the indicating strip 7. Another float 13 which can be of glass and elongated as shown, is located below the float 10 and has a rod 14 anchored thereto and extending upwardly therefrom, this rod being movable freely within the float 10 and within the central opening 3 in partition 2, the upper end of this rod 14 also being provided with an enlargement or head 15 corresponding with the heads 12 on the other rods.

Figure 4:
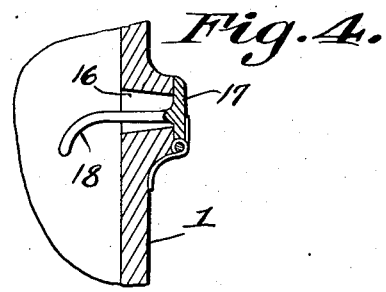
Figure 4 is an enlarged section on line 4—4, Figure 3.

A vent 16 is provided in the wall of the tubular body 1 adjacent to the upper end of compartment 4 and, as shown in Figure 4, is normally closed by spring-pressed valve 17 from which a tripping finger 18 is extended through port 16 and into chamber 4.

Normally the heads 12 and 15 are of the same elevation. A bulb 19 of rubber or the like, mounted on the open upper end of the tubular body 1, is compressed to expel air therefrom and an elongated tube 20 of rubber or the like, mounted on the open lower end of the tubular body, is inserted into the fluid to be tested. When the bulb 19 is released or expanded, the liquid will be drawn upwardly into the tubular body and will move upwardly against the float 10 and cause the heads 12 to rise back of the window 6. When these indicating heads have moved upwardly for example to the "H" graduation of the upper group at which time the heavier float 13 starts to move upwardly to indicate a graduation in the lower group 9, it can then be determined by means of a chart such as commonly employed, to tell the strength of the anti-freeze contained in the water under test. In other words the two floats differing in buoyancy will indicate by comparative readings, the strength of the anti-freeze and these readings will be taken at a point where the tester is free of liquid so that the graduations will always be clean and easy to read.

Should too much liquid be drawn into the tubular body, the float 10 would strike the finger 18 and open valve 17 so that air can rush into the chamber 4 and break the suction created by the expanding bulb 19.

What is claimed is:

1. In a testing device the combination with a tubular body, a suction bulb at one end thereof and an intake tube at the other end of the body, of a partition within the body dividing it into upper and lower communicating compartments, said upper compartment having a transparent portion, separate floats within the lower compartment differing from each other in buoyancy, rods extended from the respective floats and guided within the partition, and cooperating means on the rods and in the upper compartment positioned for exposure through said transparent portion for indicating the level and specific gravity of liquid drawn into the lower compartment.

2. A testing device including a tubular body having an upper compartment and a lower compartment, an apertured partition between the compartments, a window in the upper compartment, a suction element in communication with the upper compartment, an intake tube in communication with the lower compartment, upper and lower floats in the lower compartment differing from each other in buoyancy, rods extending from the respective floats and slidable within the partition, and means adjacent to the window and cooperating with the upper ends of the rods for indicating respectively the level of the liquid in the lower compartment and the specific gravity thereof.

3. A testing device including a tubular body having an upper compartment and a lower compartment, an apertured partition between the compartments, a window in the upper compartment, a suction element in communication with the upper compartment, an intake tube in communication with the lower compartment, upper and lower floats in the lower compartment differing from each other in buoyancy, rods extending from the respective floats and slidable within the partition, and means adjacent to the window and cooperating with the upper ends of the rods for indicating respectively the level of the liquid in the lower compartment and the specific gravity thereof, there being a vent in the upper portion of the lower compartment, a valve normally closing the vent, and means actuated by the upper float for opening the valve to admit air when the upper float reaches a predetermined level.

ISAAC RUSSELL WILBAR.